US011173537B2

(12) United States Patent
 Suzuki

(10) Patent No.: US 11,173,537 B2
(45) Date of Patent: Nov. 16, 2021

(54) FLAT-MEMBER-FEEDING DEVICE

(71) Applicant: SANKYO SEISAKUSHO CO., Tokyo (JP)

(72) Inventor: Kengo Suzuki, Kikugawa (JP)

(73) Assignee: SANKYO SEISAKUSHO CO., Tokyo (JP)

( * ) Notice: Subject to any disclaimer, the term of this patent is extended or adjusted under 35 U.S.C. 154(b) by 82 days.

(21) Appl. No.: 16/334,121

(22) PCT Filed: Aug. 15, 2017

(86) PCT No.: PCT/JP2017/029387
§ 371 (c)(1),
(2) Date: Mar. 18, 2019

(87) PCT Pub. No.: WO2018/055957
PCT Pub. Date: Mar. 29, 2018

(65) Prior Publication Data
US 2019/0255592 A1   Aug. 22, 2019

(30) Foreign Application Priority Data

Sep. 23, 2016  (JP) .............................. JP2016-186074

(51) Int. Cl.
*H02K 15/02* (2006.01)
*H02K 1/28* (2006.01)
(Continued)

(52) U.S. Cl.
CPC .............. *B21D 43/09* (2013.01); *B65G 13/00* (2013.01); *H02K 1/28* (2013.01); *H02K 7/003* (2013.01); *H02K 15/02* (2013.01); *B65G 13/02* (2013.01)

(58) Field of Classification Search
CPC ............. H02K 15/02; H02K 3/02; H02K 1/02
(Continued)

(56) References Cited

U.S. PATENT DOCUMENTS 5,582,569 A * 12/1996 Kowalewski ....... B41F 13/0045
493/34
5,808,465 A *  9/1998 Gentile .................. B21D 43/09
318/661
(Continued)

FOREIGN PATENT DOCUMENTS

DE    202006009639 U1   8/2006
JP      H03014021 U     2/1991
(Continued)

OTHER PUBLICATIONS

International Search Report (in Japanese with English Translation) for PCT/JP2017/029387, dated Nov. 21, 2017; ISA/JP.
(Continued)

*Primary Examiner* — Jose A Gonzalez Quinones
(74) *Attorney, Agent, or Firm* — Harness, Dickey & Pierce, P.L.C.

(57) ABSTRACT

Provided are a flat-member-feeding device with which it is possible to reduce power consumption and quickly supply a flat member, and a method for manufacturing the flat-member-feeding device. A method for attaching a motor for rotating a downstream roll to a flat-member-feeding device, the motor being provided with a hollow and substantially cylindrical stator and a hollow and substantially cylindrical rotor that is disposed in the space within the stator, includes: a step for disposing a sleeve so as to occupy part of the space inside the rotor, and mounting the sleeve on the rotor such that one end of the rotor is supported by one end of the sleeve and the other end of the rotor is supported by the other end of the sleeve; and a step for mounting the sleeve on a downstream roll shaft to which the downstream roll is fixed, and attaching the motor to the flat-member-feeding device.

10 Claims, 12 Drawing Sheets

(51) Int. Cl.
  *H02K 3/02* (2006.01)
  *B21D 43/09* (2006.01)
  *B65G 13/00* (2006.01)
  *H02K 7/00* (2006.01)
  *B65G 13/02* (2006.01)

(58) Field of Classification Search
  USPC ......... 310/75 R, 98, 156.12, 156.01, 156.13, 310/156.14
  See application file for complete search history.

(56) References Cited

U.S. PATENT DOCUMENTS

| | | | |
|---|---|---|---|
| 9,598,254 B2 * | 3/2017 | Gentile | B21D 43/09 |
| 2004/0000826 A1 * | 1/2004 | Meyer | D21G 1/0006 |
| | | | 310/90 |
| 2014/0183984 A1 * | 7/2014 | Kobayashi | H02K 9/22 |
| | | | 310/43 |

FOREIGN PATENT DOCUMENTS

| | | |
|---|---|---|
| JP | H07177698 A | 7/1995 |
| JP | H07332237 A | 12/1995 |
| JP | H11010259 A | 1/1999 |
| JP | 2004001078 A | 1/2004 |
| JP | 2005318679 A | 11/2005 |
| JP | 2007274826 A | 10/2007 |
| JP | 2009-107790 A | 5/2009 |
| JP | 2013536086 A | 9/2013 |
| KR | 101599710 B1 | 3/2016 |
| WO | WO-2016/146232 A1 | 9/2016 |

OTHER PUBLICATIONS

Extended European Search Report dated Apr. 15, 2020 in corresponding EP Application No. 17852737.
Office Action dated Jul. 2, 2020 in corresponding Chinese Patent Application No. 201780057751.9.
Office Action dated Aug. 18, 2021 in corresponding Korean Patent Application No. 10-2019-7008050.

* cited by examiner

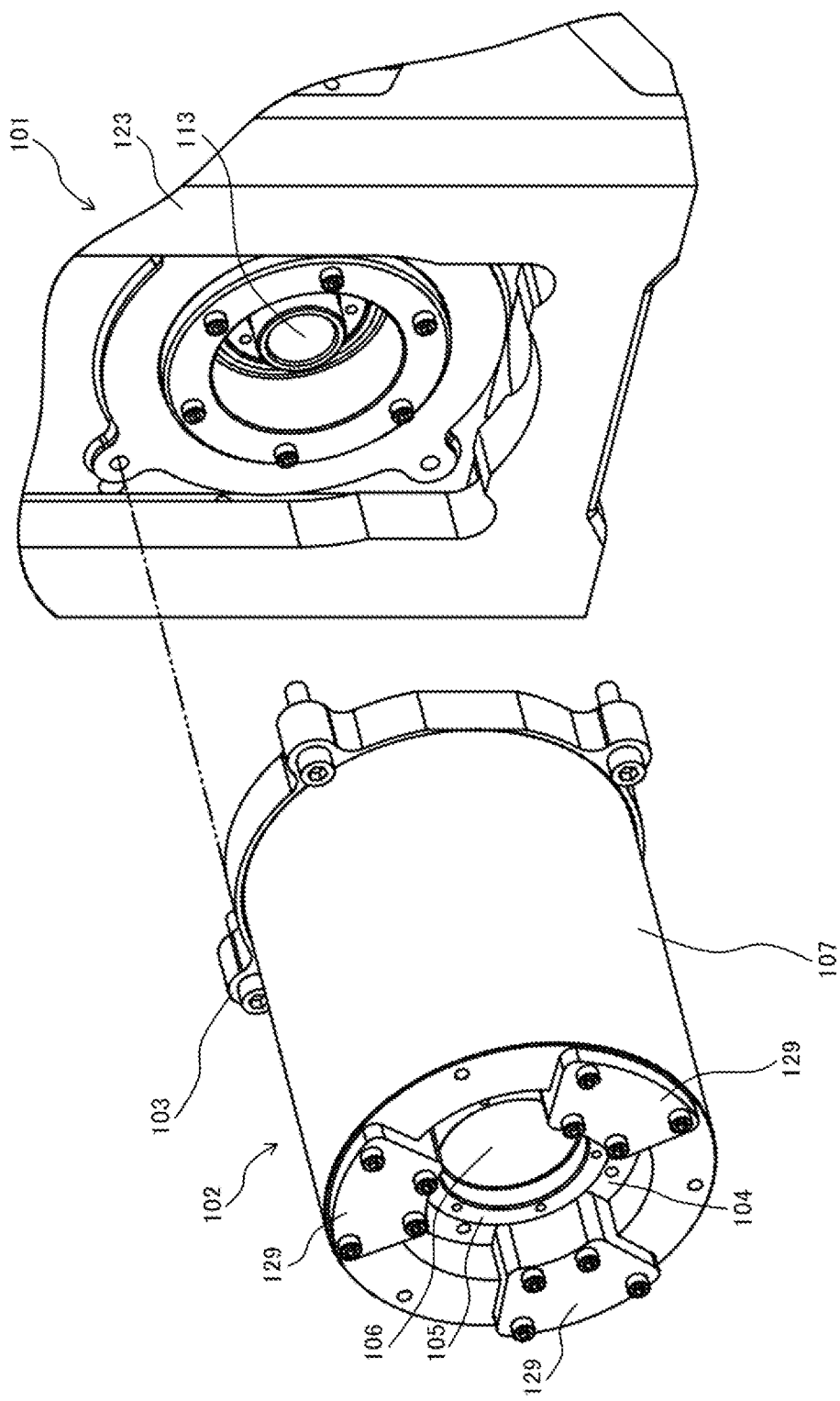

FLAT-MEMBER-FEEDING DEVICE

CROSS REFERENCE TO RELATED APPLICATIONS

This application is a U.S. National Phase Application under 35 U.S.C. 371 of International Application No. PCT/JP2017/029387 filed on Aug. 15, 2017. This application is based on and claims the benefit of priority from Japanese Patent Application No. 2016-186074 filed on Sep. 23, 2016. The entire disclosures of all of the above applications are incorporated herein by reference.

FIELD

The present disclosure relates to a flat-member-feeding device with which it is possible to realize reduction in power consumption and quickly supply a flat member to a press apparatus or the like and to a method for manufacturing the flat-member-feeding device.

BACKGROUND

Disclosed in Patent Literature 1 is a roll-type material feed apparatus which includes: a frame; a first driven feed roll; a second feed roll; a first driving motor which rotates in drive engagement relationship with the first driven feed roll; and a second driving motor which rotates in drive engagement relationship with the first driven feed roll. This roll-type material feed apparatus is provided with a speed change gear device which allows the second feed roll to be driven in cooperative relationship with the first driven feed roll. The speed change gear device has a first driving gear attached to the first driven feed roll, a first driven gear in drive engagement relationship with the first driving gear, and an intermediate coupling member for coupling the first driven gear to the second feed roll. In addition, each of the first and second driving motors has a housing, a stationary winding structure, a motor rotor shaft including a hollow end portion, a permanent magnet, and an end plate. The hollow end portion of the motor rotor shaft receives an end portion of a first driven feed roll shaft so as to allow each of the first and second driving motors to rotate in the drive engagement relationship with the first driven feed roll, thereby making the drive engagement relationship with the first driven feed roll shaft. An outer surface of the whole of the stationary winding structure is covered by the housing and the end plate.

Disclosed in Patent Literature 2 is an intermittent supply apparatus for strip-shaped blanks which includes: an electric servo motor having a driving shaft; upper shaft assemblies; an upper roller incorporated into the upper shaft assemblies; lower shaft assemblies; and a lower roller incorporated to the lower shaft assemblies. The electric servo motor is attached to a frame of the intermittent supply apparatus by screw bolts. Shaft portions of the shaft assemblies connect to the rod-like driving shaft whose one portion projects from an end face of the electric servo motor. In addition, by inserting screw fixing bolts, the respective rollers and the shaft portions of the respective shaft assemblies are clamped.

PATENT LITERATURE

PATENT LITERATURE 1: JP-A-2013-536086
PATENT LITERATURE 2: JP-A-2004-001078

SUMMARY

In the roll-type material feed apparatus in Patent Literature 1, the motor rotor shaft of each of the first and second driving motors has the hollow end portion so as to allow each of the first and second driving motors to be in the drive engagement relationship with the first driven feed roll. However, because many portions of the motor rotor shaft are made up of a material configuring the motor rotor shaft, an inertia moment of the motor rotor shaft becomes large, thereby leading to a problem in that large electric power consumed only to rotate the motor rotor shaft of each of the first and second driving motors itself is required. In order to rotate the first driven feed roll having the large inertia moment, each of the first and second driving motors is required to have a large rotation capacity, and in order to make the rotation capacity large, a diameter of the motor rotor shaft is required to be made large, thereby leading to a problem in that an inertia moment of the motor rotor shaft becomes large and electric power consumed to rotate the motor rotor shaft is also thus made large. In addition, the stationary winding structure is covered by the housing and the end plate, thereby leading to a problem in that heat generated by the stationary winding structure is hardly dissipated and further, to a problem in that heat is confined in the stationary winding structure, and a rotation efficiency of the motor rotor shaft is thus deteriorated.

In order to obtain a high rotation capacity, it is required for a diameter of a rotor of a motor to be made large. In the electric servo motor of the intermittent supply apparatus in Patent Literature 2, as in Patent Literature 1, if the diameter thereof is made large, the inertia moment of the driving shaft becomes large, thereby leading to a problem in that electric power consumed to rotate the driving shaft becomes large.

Accordingly, objects of the present disclosure are to solve the above-described problems, to realize reduction in power consumption, and to provide a flat-member-feeding device in which a motor having a high rotation capacity is used and which is operable to quickly supply flat members and a method for attaching the motor to the flat-member-feeding device.

According to one aspect of the present disclosure, a method for attaching a motor to a flat-member-feeding device, the flat-member-feeding device including: a housing; a first roll being housed inside the housing; and a second roll being housed inside the housing and being disposed on an upper side of the first roll in a vertical direction, the flat-member-feeding device being operable to convey a flat member being clamped by the first roll and the second roll, the motor being coupled to one of the first roll and the second roll to rotate the one of the first roll and the second roll, includes: the steps of: detaching, from the motor including a substantially cylindrical stator being provided with a hollow and a substantially cylindrical rotor being disposed in the hollow of the stator and being provided with a hollow, a first fixing member being disposed to avoid attachment of the stator and the rotor; attaching a sleeve to the rotor such that the sleeve is disposed so as to occupy one part of the hollow of the rotor, one end portion of the rotor is supported by one end portion of the sleeve, and another end portion of the rotor is supported by another end portion of the sleeve; attaching the motor to the flat-member-feeding device by attaching the sleeve to a roll shaft, the one of the first roll and the second roll being fixed to the roll shaft; and detaching a second fixing member being disposed to avoid attachment of the stator and the rotor.

According to one specific example of the present disclosure, the method for attaching the motor thereto further includes the step of attaching an attaching plate to the stator, the motor being attached to the flat-member-feeding device via the attaching plate.

According to one specific example of the present disclosure, the method for attaching the motor thereto further includes the step of, after the step of detaching the second fixing member, attaching a motor housing to the stator, the motor housing not covering at least one part of the stator.

According to one specific example of the present disclosure, the method for attaching the motor thereto further includes the step of, after the step of detaching the second fixing member, attaching a rotational angle sensor to the sleeve.

According to another aspect of the present disclosure, a flat-member-feeding device includes: a housing; a first roll being housed inside the housing; a second roll being housed inside the housing and being disposed on an upper side of the first roll in a vertical direction; and a first motor being coupled to one of the first roll and the second roll to rotate the one of the first roll and the second roll, the flat-member-feeding device being operable to convey a flat member being clamped by the first roll and the second roll, the first motor including a substantially cylindrical stator being provided with a hollow and a substantially cylindrical rotor being disposed in the hollow of the stator and being provided with a hollow, and in the flat-member-feeding device, a sleeve is disposed so as to occupy one part of the hollow of the rotor, one end portion of the sleeve supports one end portion of the rotor, and another end portion of the sleeve supports another end portion of the rotor, to make the sleeve operable to rotate in conjunction with rotation of the rotor, and the one end portion of the sleeve is coupled to a roll shaft, the one of the first roll and the second roll being fixed to the roll shaft, to make the one of the first roll and the second roll operable to rotate in conjunction with rotation of the sleeve.

According to one specific example of the present disclosure, in the flat-member-feeding device, the sleeve is of a substantially cylindrical shape being provided with a hollow.

According to one specific example of the present disclosure, in the flat-member-feeding device, at least one part of the stator directly contacts outside air.

According to one specific example of the present disclosure, the flat-member-feeding device includes a second motor being coupled to another of the first roll and the second roll, the second motor including a substantially cylindrical stator being provided with a hollow and a substantially cylindrical rotor being disposed in the hollow of the stator and being provided with a hollow.

According to one specific example of the present disclosure, in the flat-member-feeding device, the roll shaft with the one of the first roll and the second roll being fixed is provided with a first gear, a roll shaft with the another of the first roll and the second roll being fixed is provided with a second gear, and the first gear and the second gear are engaged with each other, to make the another of the first roll and the second roll operable to rotate in conjunction with rotation of the one of the first roll and the second roll.

According to one specific example of the present disclosure, in the flat-member-feeding device, the roll shaft with at least one of the first roll and the second roll being fixed is provided with a coupling device, and via the coupling device, the at least one of the first roll and the second roll is operable to move in a vertical direction with respect to the housing.

According to the present disclosure, a motor which includes a substantially cylindrical rotor provided with a hollow can be attached to a flat-member-feeding device. In addition, since by using the motor which includes the substantially cylindrical rotor provided with the hollow, an inertia moment of the rotor becomes small, electric power consumed to rotate the rotor can be made small and the rotor can be quickly rotated, and without increasing a diameter of the rotor, a high rotation capacity of the rotor can be obtained, thereby allowing reduction in power consumption, speeding-up, and downsizing of the flat-member-feeding device to be realized. Further, it is made possible to facilitate dissipation of heat generated by the motor.

Other objects, features, and advantages of the present disclosure will become apparent from the following description of the embodiments of the present disclosure taken in conjunction with the accompanying drawings.

DRAWINGS

FIG. 3G is a perspective view showing the step of attaching the motor shown in FIG. 3F to the flat-member-feeding device.

DESCRIPTION

Hereinafter, an embodiment of the present disclosure will be described with reference to the accompanying drawings. However, the present disclosure is not limited to these embodiments.

Figure 1:
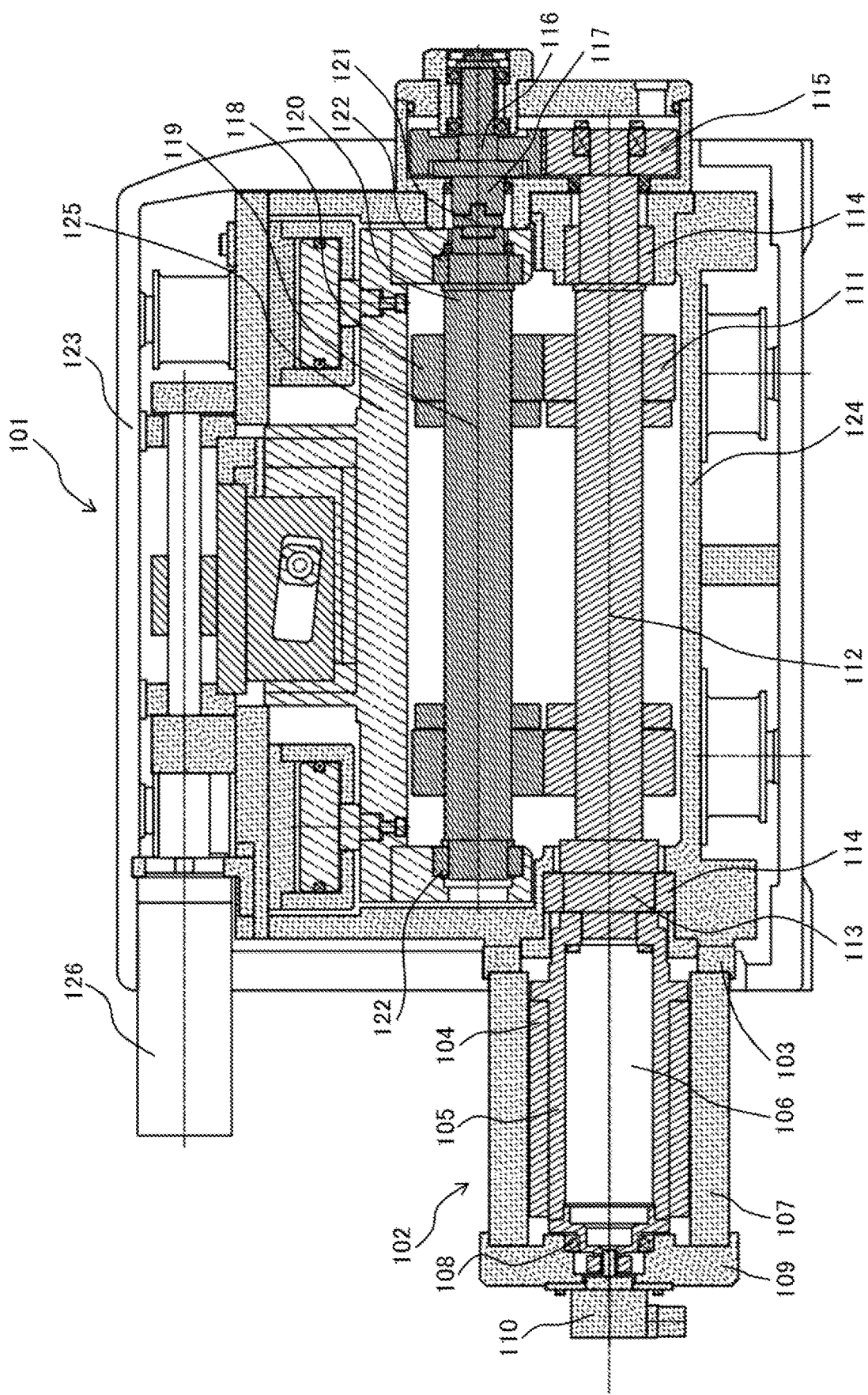
FIG. 1 is a cross-sectional schematic diagram of a flat-member-feeding device as one embodiment of the present disclosure, viewed from the front thereof.
Figure 2:
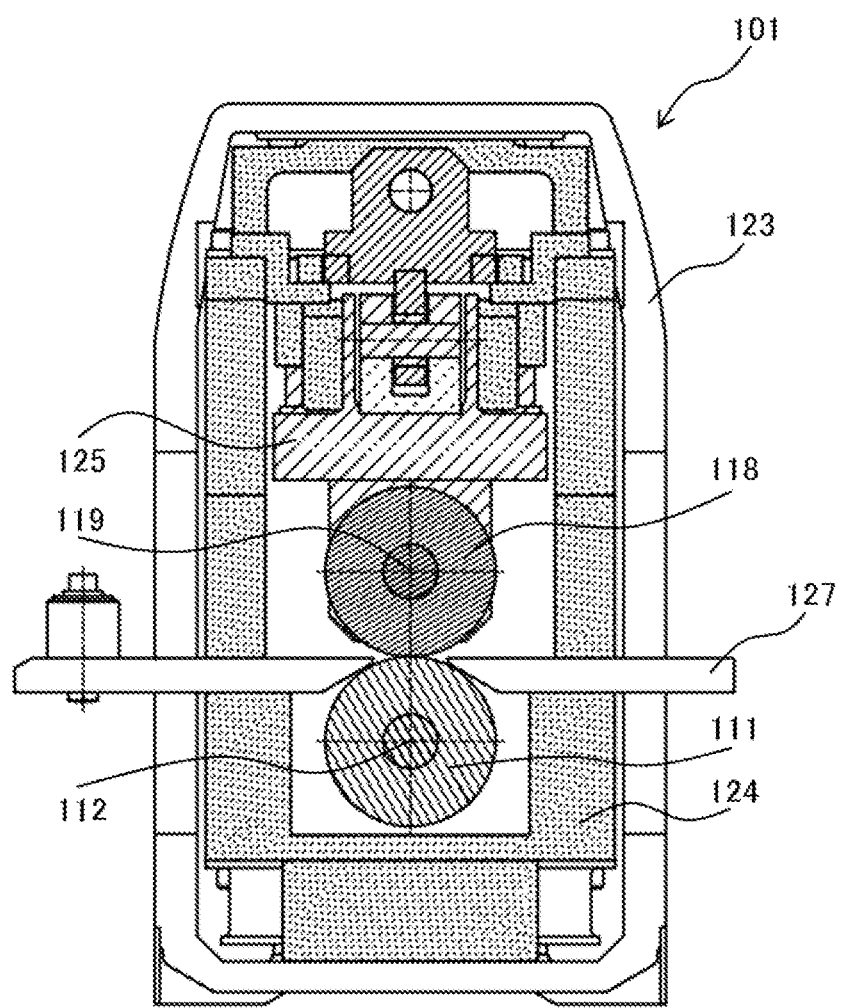
FIG. 2 is a cross-sectional schematic diagram of the flat-member-feeding device shown in FIG. 1, viewed from the side thereof.

With reference to FIG. 1 and FIG. 2, a flat-member-feeding device as one embodiment of the present disclosure will be described. In FIG. 1, a schematic diagram of the flat-member-feeding device 101 is shown. The flat-member-feeding device 101 includes: a main body housing 123; a first roll (lower roll) 111 housed inside the main body housing 123; and a second roll (upper roll) 118 housed inside the main body housing 123 and disposed on an upper side of the lower roll 111 in a vertical direction. In addition, the flat-member-feeding device 101 includes: a lower roll supporting member 124 housed inside the main body housing 123 and rotatably supporting the lower roll 111; and an upper roll supporting member 125 housed inside the main body housing 123 and rotatably supporting the upper roll 118. The lower roll 111 is fixed to a first roll shaft (lower roll shaft) 113 and is capable of rotating with a first roll shaft line (lower roll shaft line) 112 as a center. The upper roll 118 is fixed to a second roll shaft (upper roll shaft) 120 and is capable of rotating with a second roll shaft line (upper roll shaft line) 119 as a center. The lower roll 111 and the upper roll 118 contact a flat member guided by a flat member guide 127 and clamp the flat member, and the lower roll 111 and the upper roll 118 rotate, whereby the clamped flat member is conveyed. The flat-member-feeding device 101 includes a motor 102 which is coupled to one of the lower roll 111 and the upper roll 118 and is to rotate the one thereof. In a case shown in FIG. 1 and FIG. 2, the motor 102 is coupled to the lower roll 111 and directly rotates the lower roll 111. However, the motor 102 may be coupled to the upper roll 118 and directly rotate the upper roll 118.

The motor 102 includes a substantially cylindrical stator 107 provided with a hollow and a substantially cylindrical rotor 104 disposed in the hollow of the stator 107 and provided with a hollow, and in conjunction with rotation of the rotor 104, the lower roll 111 can be rotated. The rotor 104 is provided with the hollow 106, thereby allowing an inertia moment (inertia) of the rotor 104 to be made small and electric power (energy) consumed to rotate the rotor 104 itself to be made small. Thus, as compared with a motor which includes a rotor provided with no hollow, without making a size of the motor 102 large, it is made possible to convey a flat member having a large weight, thereby allowing the flat-member-feeding device 101 having a high conveyance capability to be provided.

In the hollow 106 provided for the rotor 104, a sleeve 105 is disposed so as to occupy one part of the hollow 106 of the rotor 104, and the sleeve 105 is coupled to the rotor 104. The sleeve 105 coupled to the rotor 104 rotates in conjunction with the rotation of the rotor 104. Note that in order to make power consumption small, it is required to make an inertia moment of the sleeve 105 small. Although in order to make the inertia moment of the sleeve 105 small, it is preferable that a shape of the sleeve 105 is a shape small in weight and volume, the shape thereof is determined in consideration of a balance with stiffness of the sleeve 105. As the shape of the sleeve 105, a shape in which one end portion of the sleeve 105 can support one end portion of the rotor 104 and the other end portion of the sleeve 105 can support the other end portion of the rotor 104 may be configured, and when the rotor 104 is rotating, the rotor 104 may be in no contact with the stator 107. For example, as the shape of the sleeve 105, a substantially cylindrical shape provided with a hollow is cited.

The sleeve 105 is coupled to the lower roll 111 via an end portion of the sleeve 105 and the lower roll shaft 113. Both ends of the lower roll shaft 113 are rotatably supported by lower roll bearings 114 disposed in the lower roll supporting member 124. The lower roll 111 coupled to the sleeve 105 rotates with respect to the lower roll supporting member 124 in conjunction with rotation of the sleeve 105.

The motor 102 may include a motor housing 109 for housing the stator 107 on an end portion on a side opposite to an end portion on a side on which the motor 102 is coupled to the flat-member-feeding device 101. The motor housing may be provided with a motor bearing 108 so as to allow rotation of the rotor 104 and the sleeve 105 with respect to the stator 107 to be supported. Note that the motor housing 109 may be arranged not to house all of the stator 107 but to allow at least one part of the stator 107 to directly contact outside air. By causing the one part of the stator 107 to directly contact the outside air as described above, an efficiency of air cooling for the motor 102 can be enhanced. In addition, the motor 102 may include a rotational angle sensor which is operable to measure a rotational angle of the rotor 104 and to thereby detect a rotational speed. As the rotational angle sensor, for example, a magnetic resolver and an optical encoder are cited.

The flat-member-feeding device 101 may include a second motor. The second motor may have the same configuration as that of the motor 102 so as to include a substantially cylindrical stator having a hollow and a substantially cylindrical rotor disposed in the hollow of the stator and having a hollow. The rotor of the second motor is coupled to the upper roll 118 via an upper roll shaft 120. Both ends of the upper roll shaft 120 are rotatably supported by upper roll bearings 122 disposed in the upper roll supporting member 125. The upper roll 118 rotates with respect to the upper roll supporting member 125 in conjunction with rotation of the rotor of the second motor. As described above, each of the motors has each of the rolls coupled thereto and each of the rolls is rotated, thereby allowing a flat member having a large weight to be conveyed even with a rotation capacity of each of the motors made small and enabling the flat-member-feeding device 101 having a high conveyance capability to be provided.

Note that when the flat-member-feeding device 101 includes the second motor, the flat-member-feeding device 101 may include a controller which receives a signal of a rotational speed of the rotor 104, detected by a rotational angle sensor 110 provided for the motor 102, and a signal of a rotational speed of the rotor, detected by a rotational angle sensor provided for the second motor. The controller determines whether each of these detected rotational speeds corresponds to a predetermined rotational speed and controls the rotational speed of the rotor of each of the motors, thereby allowing the upper roll 118 and the lower roll 111 to be operable to synchronously rotate at the predetermined rotational speed.

In the flat-member-feeding device 101, the lower roll shaft 113 with the lower roll 111 fixed may be provided with a first gear (lower roll gear) 115 and the upper roll shaft 120 with the upper roll 118 fixed may be provided with a second gear (upper roll gear) 116. The lower roll gear 115 and the upper roll gear 116 intermesh and are engaged with each other, and rotation of the lower roll gear 115 is transmitted to the upper roll gear 116. Thus, in conjunction with the rotation of the lower roll 111 caused by the rotation of the rotor 104 of the motor 102, the upper roll 118 can rotate. Note that although in FIG. 1, the lower roll gear 115 and the upper roll gear 116 are provided on an end portion of the lower roll shaft 113 and an end portion of the upper roll shaft 120 on a side opposite to a side of the motor 102, the lower roll gear 115 and the upper roll gear 116 may be provided on an end portion of the lower roll shaft 113 and an end portion of the upper roll shaft 120 on the same side as the side of the motor 102. The rotation is transmitted by the gears, thereby allowing the lower roll 111 and the upper roll 118 to synchronously rotate.

Figure 3A:
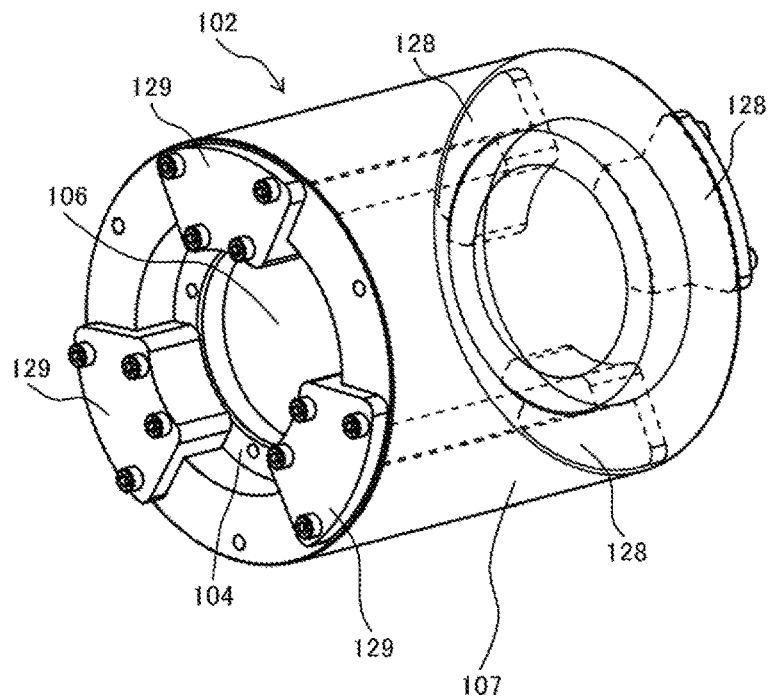
FIG. 3A is a perspective view of a motor as one embodiment, attached to the flat-member-feeding device shown in FIG. 1, whose one part is viewed in a see-through manner.

Next, with reference to FIG. 3A to FIG. 3M, a method for attaching the motor 102 to the flat-member-feeding device 101 as one embodiment of the present disclosure will be described. In FIG. 3A, the motor 102 which includes the substantially cylindrical stator 107 provided with the hollow and the substantially cylindrical rotor 104 disposed in the hollow of the stator 107, being rotatable with respect to the stator 107, and provided with the hollow is shown. The motor 102 is provided with first fixing members 128 and second fixing members 129 for fixing the stator 107 and the rotor 104 on both end portions of the stator 107 and the rotor 104 so as not to be attached to each other by a magnetic force.

Figure 3B:
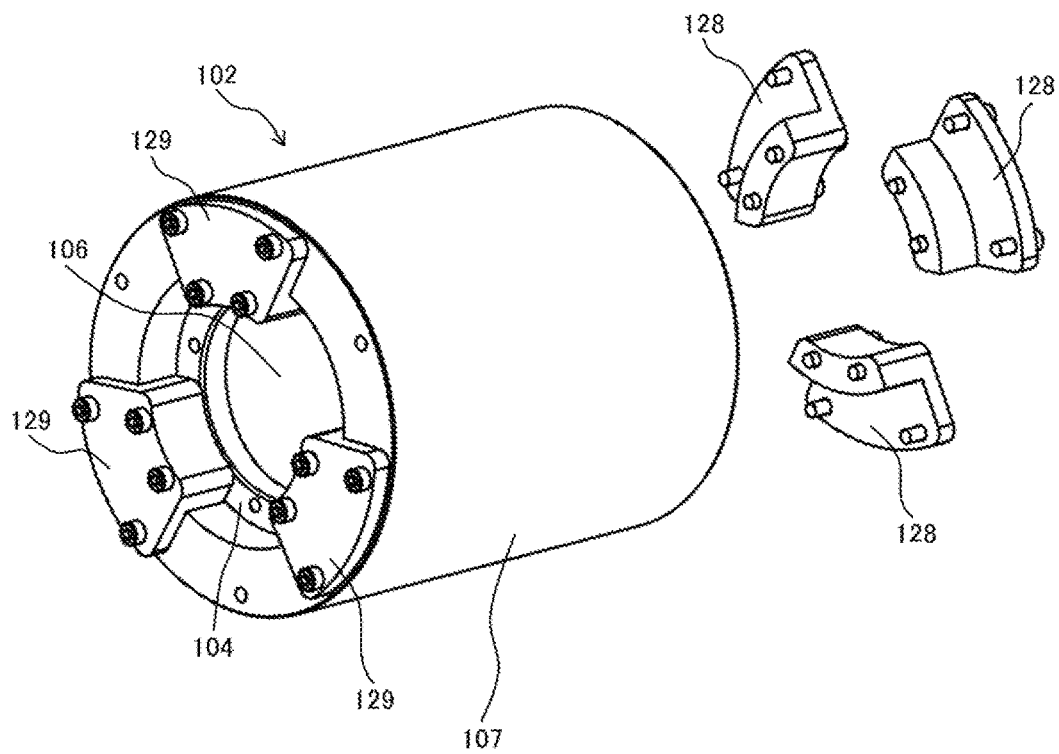
FIG. 3B is a perspective view showing a state in which fixing members are detached from the motor shown in FIG. 3A.

As shown in FIG. 1 and FIG. 2, in order to attach the motor, which is coupled to one of the lower roll 111 and the upper roll 118 to rotate the one of the rolls, to the flat-member-feeding device 101 which includes: the main body housing 123; the lower roll 111 housed inside the main body housing 123; and the upper roll 118 housed inside the main body housing 123 and disposed on the upper side of the lower roll 111 in the vertical direction and is configured to convey a flat member clamped by the lower roll 111 and the upper roll 118, first, as shown in FIG. 3B, the first fixing members 128 are detached from the motor 102. Note that although in FIG. 1 and FIG. 2, the motor 102 is attached on the side of the lower roll 111, also in a case in which the motor is attached on a side of the upper roll 118, the similar detachment is performed.

Figure 3C:
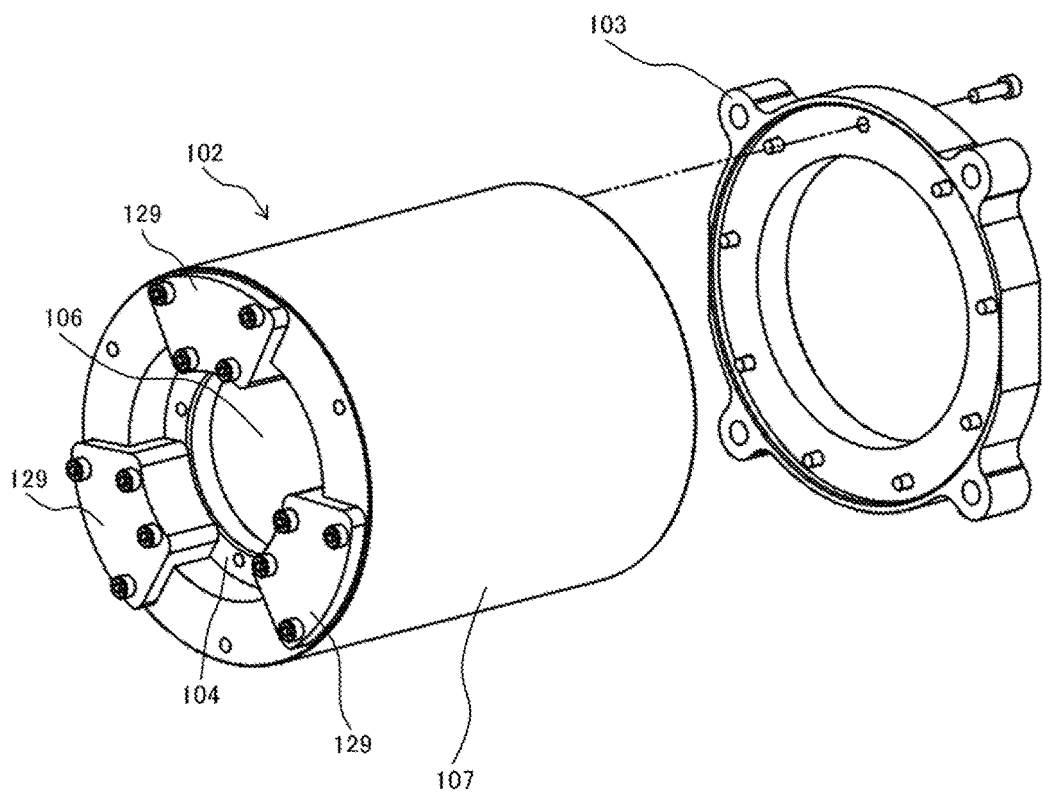
FIG. 3C is a perspective view showing the step of attaching an attaching plate to the motor shown in FIG. 3B.
Figure 3D:
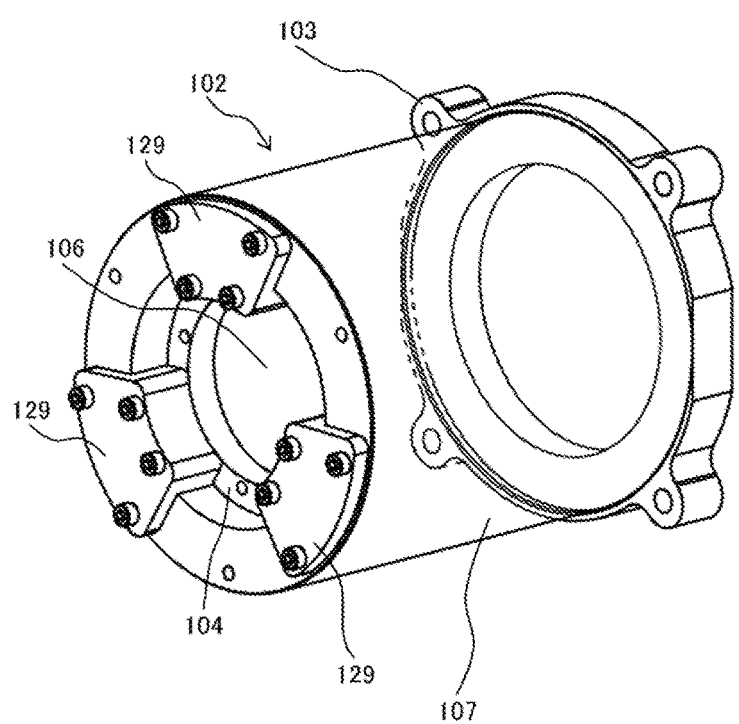
FIG. 3D is a perspective view showing a state in which the attaching plate is attached to the motor shown in FIG. 3B, whose one part is viewed in a see-through manner.

As shown in FIG. 3C and FIG. 3D, on an end portion side of the stator 107 from which the first fixing members 128 are detached, an attaching plate 103 is attached. As a method for attaching the attaching plate 103 to the stator 107, for example, screwing is cited. Note that although the motor 102 is attached to the flat-member-feeding device 101 via the attaching plate 103, the motor 102 may be attached to the flat-member-feeding device 101 directly via the stator 107, not via the attaching plate 103.

Figure 3E:
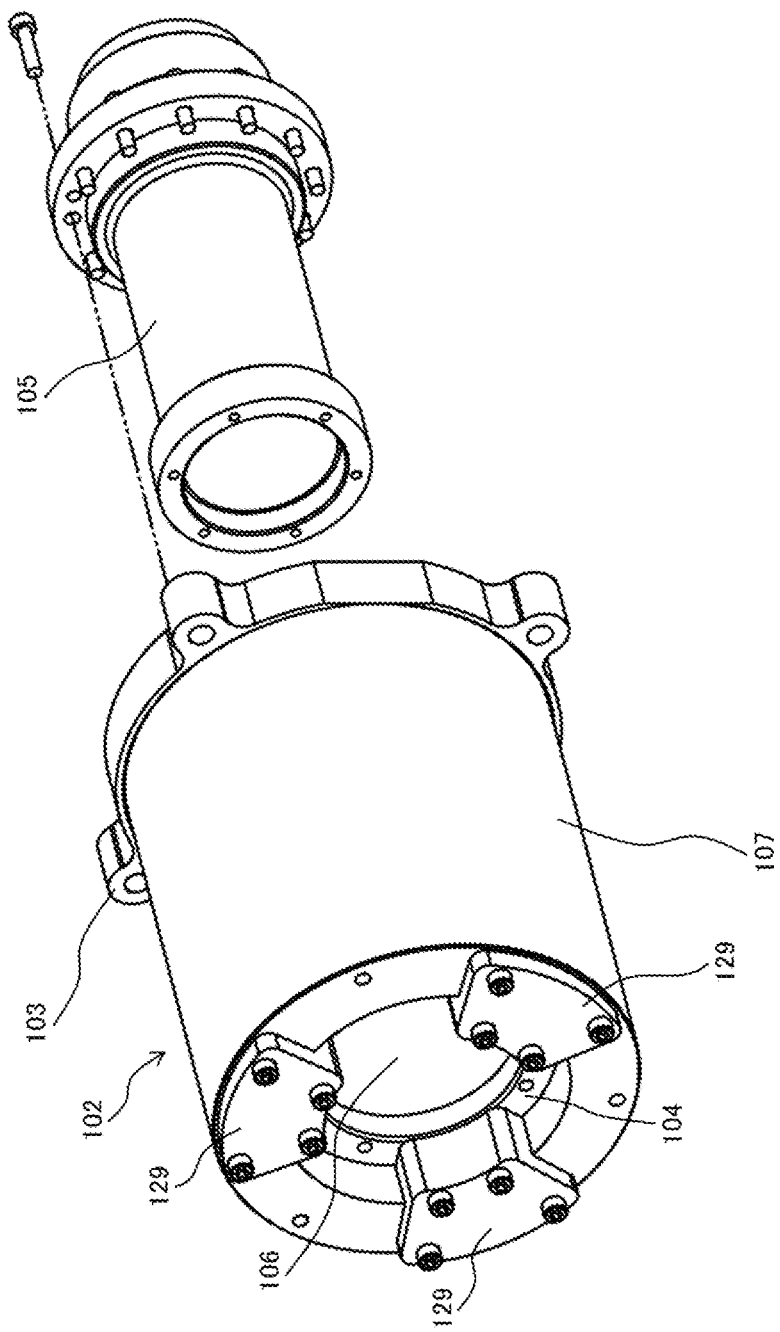
FIG. 3E is a perspective view showing the step of attaching a sleeve to the motor shown in FIG. 3D.
Figure 3F:
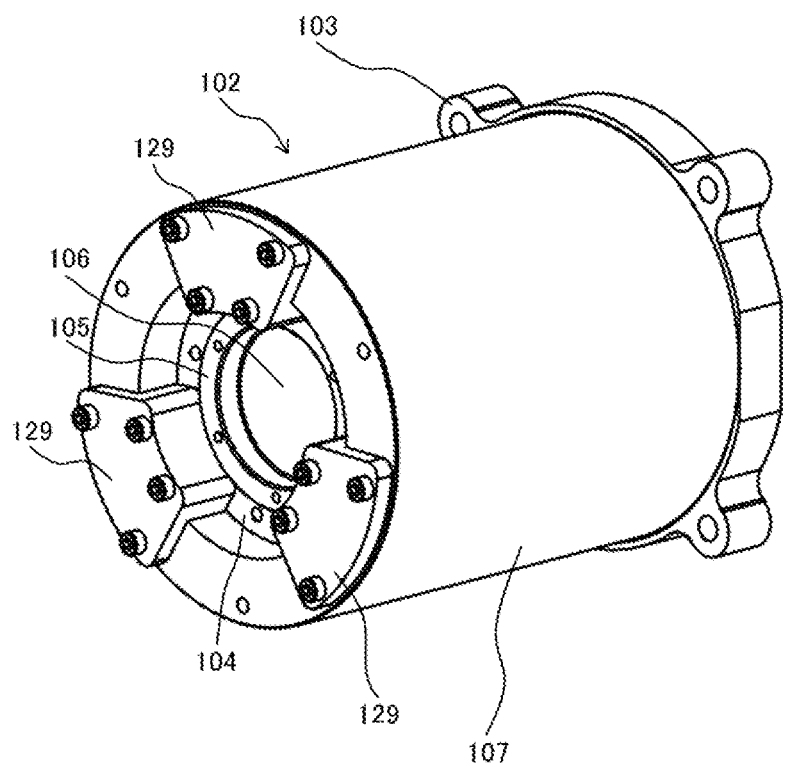
FIG. 3F is a perspective view showing a state in which the sleeve is attached to the motor shown in FIG. 3D.
Figure 3H:
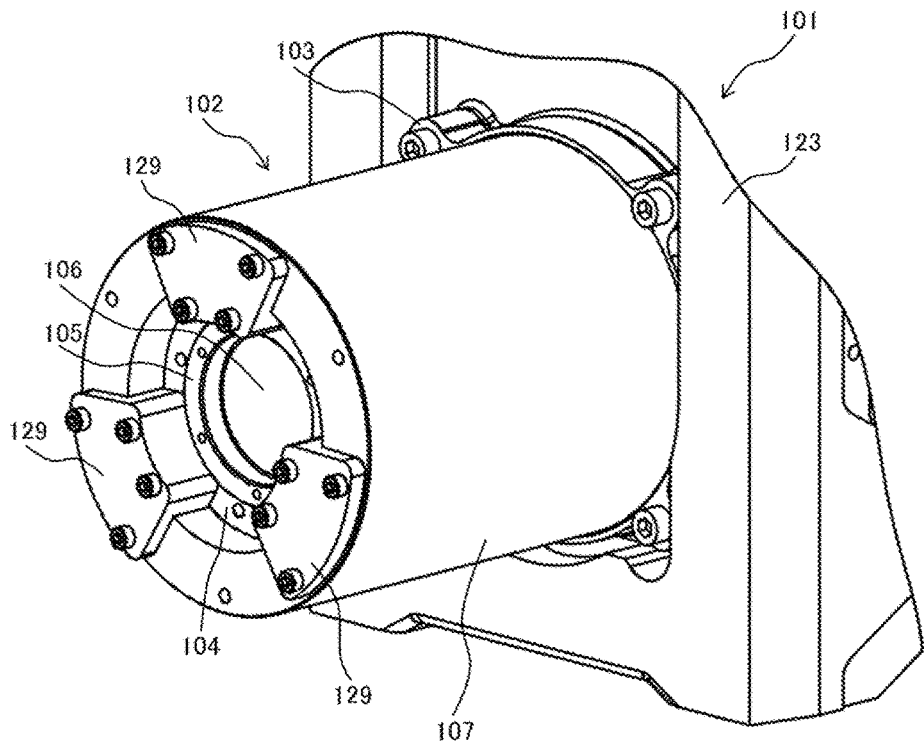
FIG. 3H is a perspective view showing a state in which the motor shown in FIG. 3F is attached to the flat-member-feeding device.
Figure 3I:
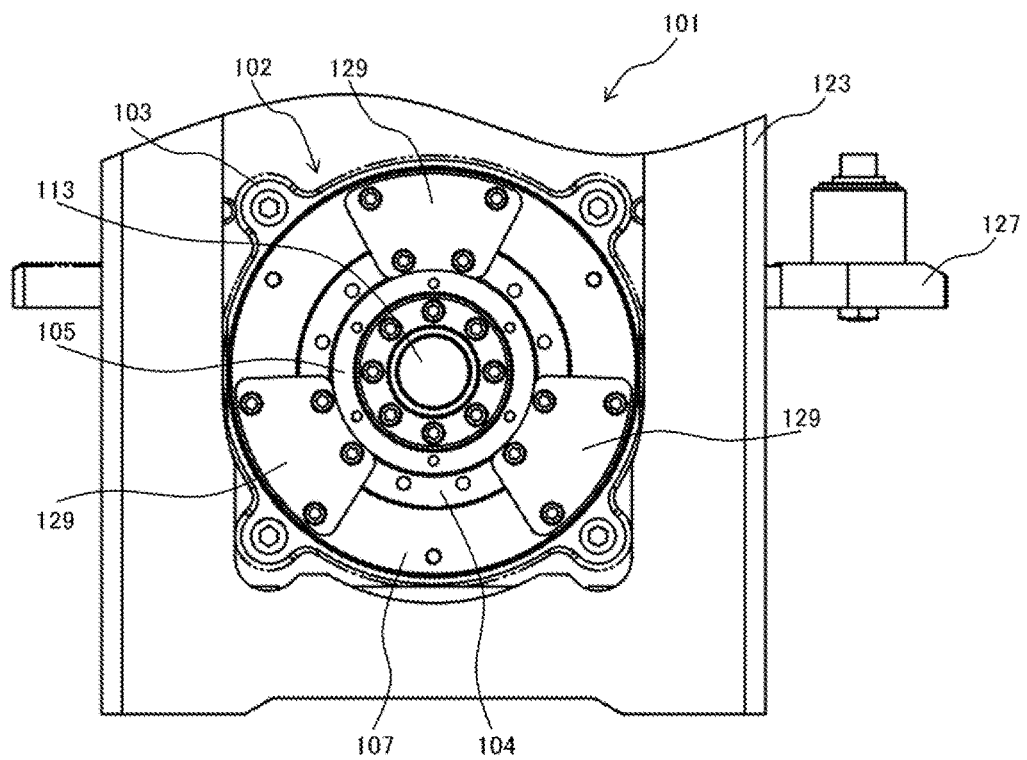
FIG. 3I is a schematic diagram showing a state in which the motor shown in FIG. 3F is attached to the flat-member-feeding device, viewed from the side.

As shown in FIG. 3E and FIG. 3F, the sleeve 105 is disposed so as to occupy one part of the hollow 106 of the rotor 104, one end portion of the rotor 104 is supported by one end portion of the sleeve 105, and the other end portion of the rotor 104 is supported by the other end portion of the sleeve 105, thereby attaching the sleeve 105 to the rotor 104. As a method for attaching the sleeve 105 to the rotor 104, for example, screwing is cited.

As shown in FIG. 3G to FIG. 3J, after attaching the sleeve 105 to the rotor 104, the sleeve 105 is attached to one end portion of the lower roll shaft 113 with the lower roll 111 fixed. As a method for attaching the sleeve 105 to the lower roll shaft 113, for example, cited is a method in which the sleeve 105 is attached to the lower roll shaft 113 such that screws are caused to pass through the hollow 106 and are inserted into screw holes for screwing the sleeve 105 to the lower roll shaft 113. The motor 102 is attached and fixed to the flat-member-feeding device 101 via the attaching plate 103 or via the stator 107. As a method for attaching the motor 102 to the flat-member-feeding device 101, for example, screwing is cited.

Figure 3J:
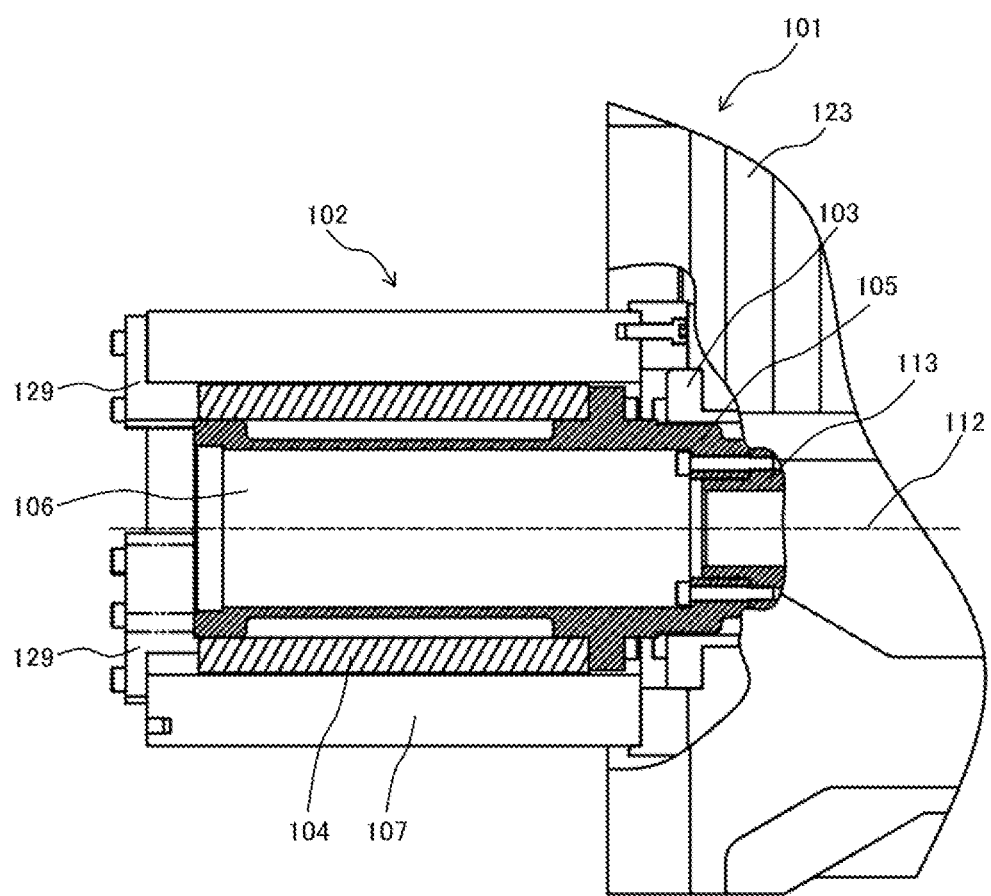
FIG. 3J is a partial cross-sectional schematic diagram showing a state in which the motor shown in FIG. 3F is attached to the flat-member-feeding device, viewed from the front.

In order to make the rotor 104 rotatable with low power consumption, it is required to make an inertia moment of the sleeve 105 as small as possible. Accordingly, the sleeve 105 is disposed so as to occupy the one part of the hollow 106 of the rotor 104. As shown in FIG. 3J, the sleeve 105 is formed to be of a shape allowing the hollow 106 of the rotor 104 to be ensured. As the shape of the sleeve 105, for example, a substantially cylindrical shape provided with a hollow is cited. The sleeve 105 may be attached to the rotor 104 such that the rotor 104 and the sleeve 105 contact each other on an end portion on a side of the flat-member-feeding device 101, and the rotor 104 and the sleeve 105 contact each other on an end portion on a side opposite to the flat-member-feeding device 101 and the sleeve 105 thereby supports the rotor 104. A portion (hollow) in which the rotor 104 and the sleeve 105 do not contact each other may be provided between the rotor 104 and the sleeve 105, and the inertia moment of the sleeve 105 may be made as small as possible.

Figure 3K:
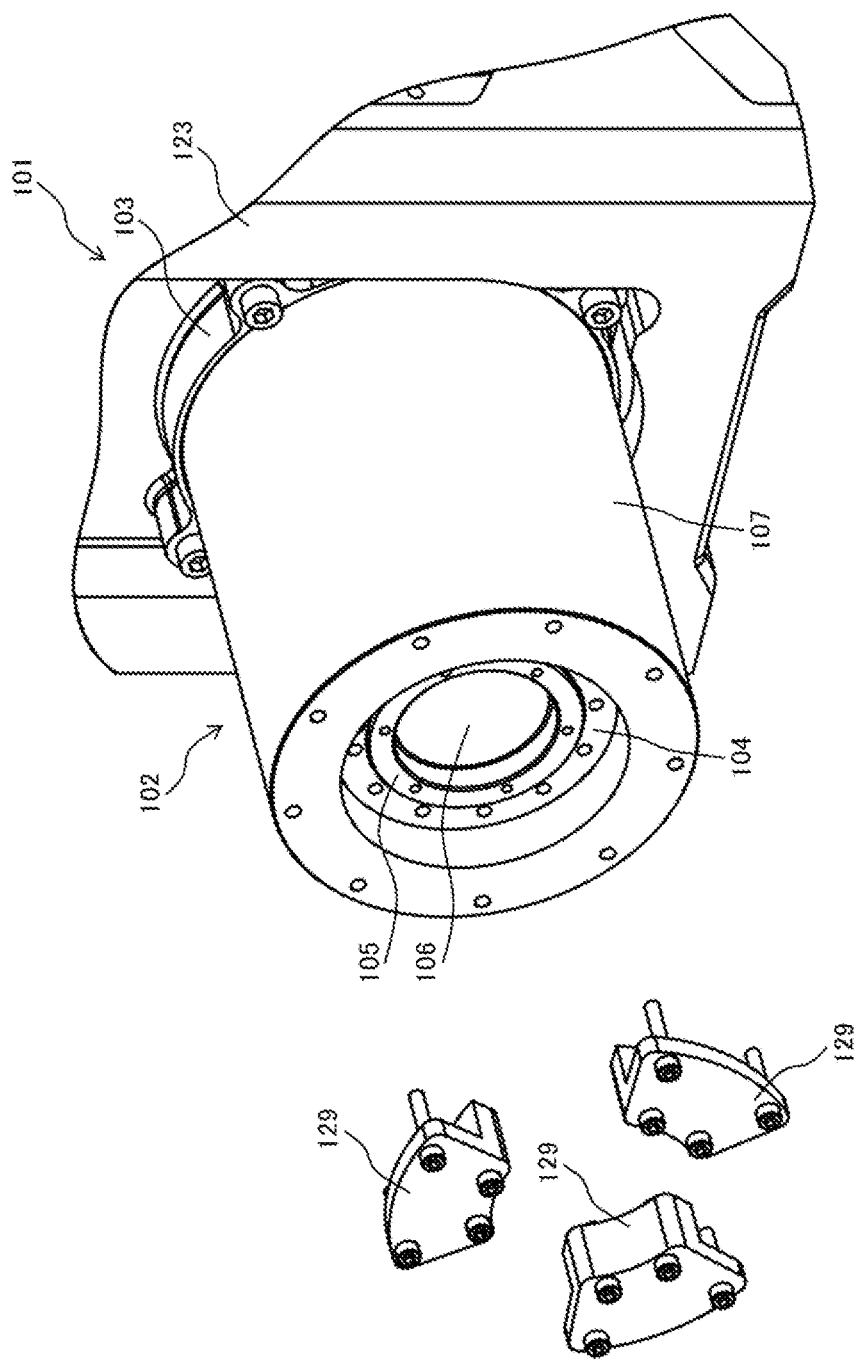
FIG. 3K is a perspective view showing a state in which fixing members are detached from the motor shown in FIG. 3H.

As shown in FIG. 3J, after attaching the sleeve 105 to the lower roll shaft 113 and attaching the motor 102 to the flat-member-feeding device 101, as shown in FIG. 3K, the second fixing members 129 disposed to allow the stator 107 and the rotor 104 not to be attached to each other are detached.

Figure 3L:
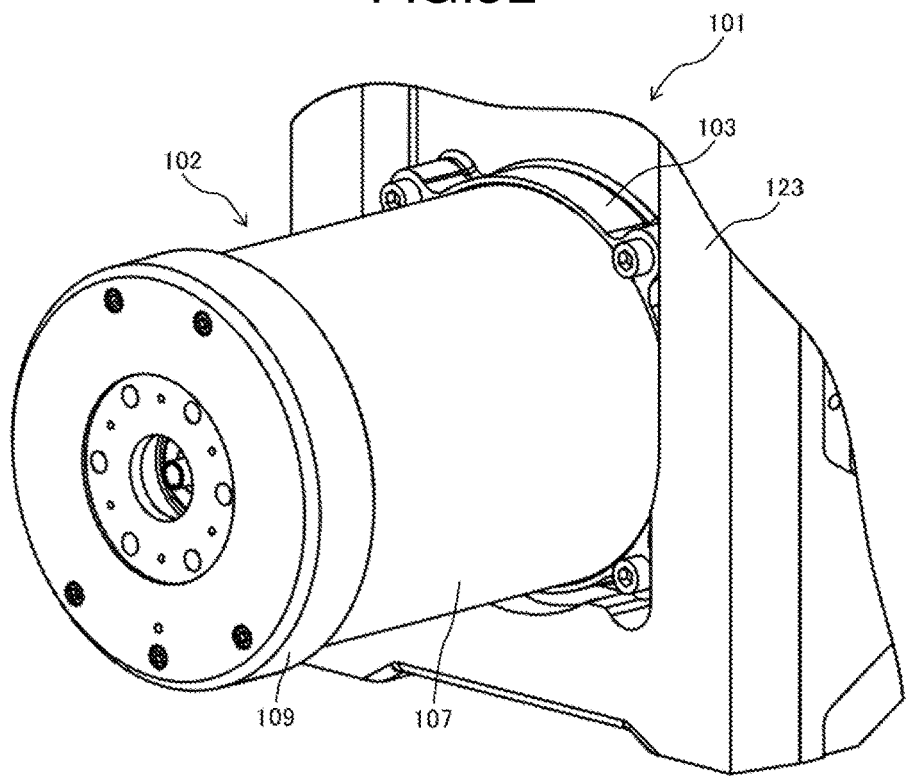
FIG. 3L is a perspective view showing a state in which a motor housing is attached to the motor shown in FIG. 3K.

Note that as shown in FIG. 3L, after detaching the second fixing members 129, the motor housing 109 may be attached to the stator 107 from a side of the end portion of the stator 107 with the second fixing members 129 detached. In order to facilitate dissipation of heat generated in the stator 107, the motor housing 109 may be attached to the stator 107 such that all of the stator 107 is not covered by the motor housing 109 but at least one part of an outer surface of the stator 107 is not covered. Thus, the stator 107 can be made to directly contact outside air, thereby allowing an air cooling efficiency of the stator 107 to be enhanced.

Figure 3M:
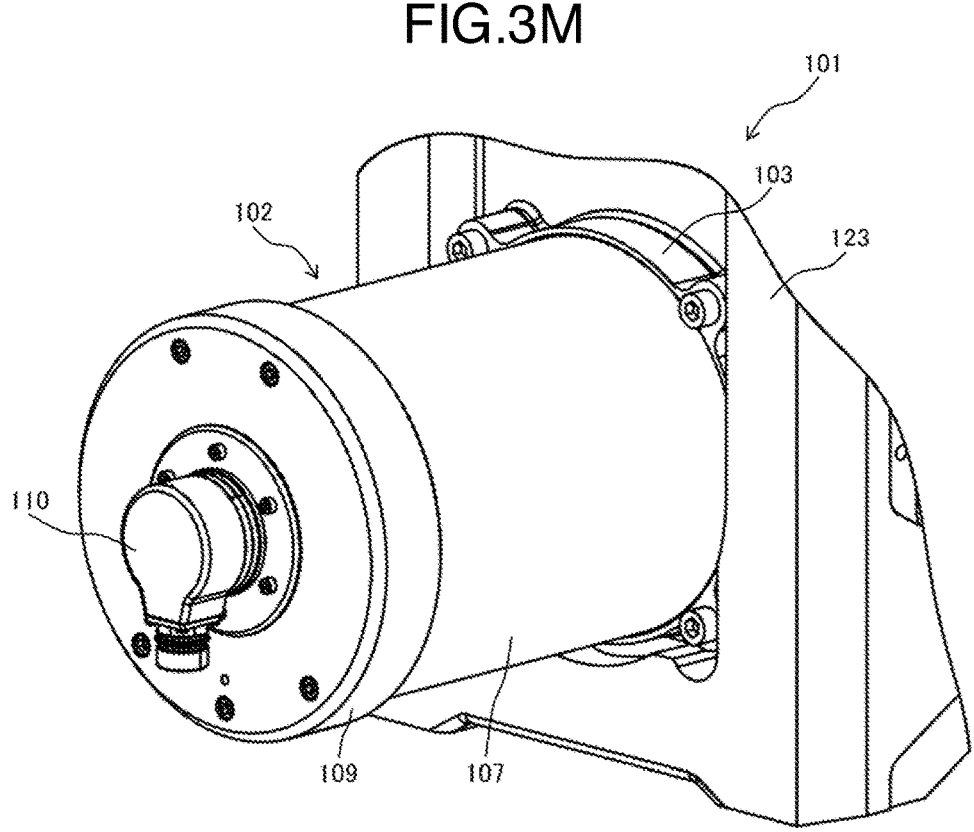
FIG. 3M is a perspective view showing a state in which an encoder is attached to the motor shown in FIG. 3L.

In addition, as shown in FIG. 3M, the rotational angle sensor 110 for detecting moving directions, moving amounts, and angles of the rotor 104, the sleeve 105, and the lower roll 111 may be attached to the sleeve 105. Based on detection results obtained by the rotational angle sensor 110, a flat member guided by the flat member guide 127 can be conveyed with a high accuracy.

As shown in FIG. 1 and FIG. 2, the flat-member-feeding device 101 includes the lower roll supporting member 124 and the upper roll supporting member 125 inside the housing 123, and the lower roll supporting member 124 and the upper roll supporting member 125 rotatably support the both end portions of the lower roll 108 via the lower roll bearings 114 and rotatably support the both end portions of the upper roll 118 via the upper roll bearings 122, respectively. In FIG. 1 and FIG. 2, by driving a motor 126 for releasing, the upper roll supporting member 125 is operable to move in a vertical direction with respect to the main body housing 123 together with the upper roll 118, that is, is operable to move up and down, and by causing the upper roll supporting member 125 to move in the vertical direction with respect to the main body housing 123, a flat member can be clamped and released. Note that the lower roll supporting member 124 may be caused to move in the vertical direction with respect to the main body housing 123, thereby allowing the flat member to be clamped and released.

In addition, in the flat-member-feeding device 101, a coupling device 121 may be provided on the roll shaft with at least one of the lower roll 111 and the upper roll 118 fixed, and via the coupling device 121, the at least one roll may be operable to move in the vertical direction with respect to the main body housing 123. In FIG. 1, the coupling device 121 is provided on the upper roll shaft 120 with the upper roll 118 fixed, and the rotation of the upper roll gear 116 caused by the rotation of the lower roll gear 115 is transmitted to the upper roll shaft 120 via the coupling device 121, thereby allowing the upper roll 118 to rotate. In addition, via the coupling device 121, the upper roll 118 is operable to move in the vertical direction with respect to the main body housing 123, thus allowing a flat member guided by the flat member guide 127 to be clamped and released. Note that instead of the upper roll gear 116, the second motor may be used, and rotation of the rotor of the second motor may be transmitted to the upper roll shaft 120 via the coupling device 121, thereby allowing the upper roll 118 to rotate, and via the coupling device 121, the upper roll 118 may be operable to move in the vertical direction with respect to the second motor and the main body housing 123.

Figure 4:
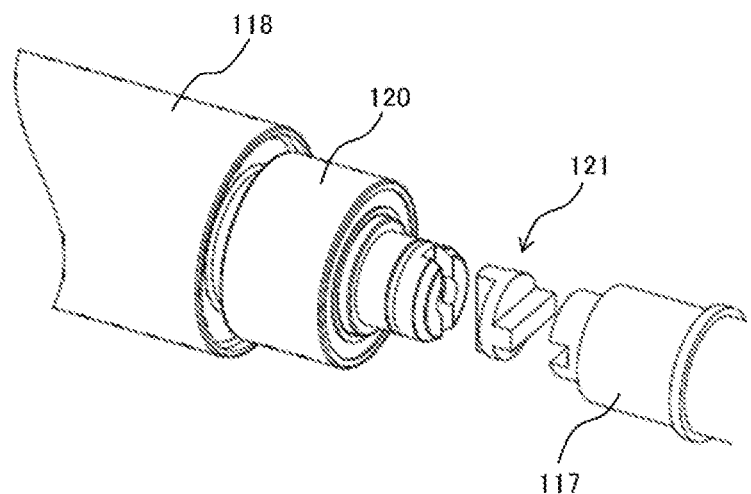
FIG. 4 is a perspective view illustrating relationship of a roll shaft, a coupling device, and a gear shaft as one embodiment in the flat-member-feeding device shown in FIG. 1.

In FIG. 4, relationship of the upper roll shaft 120 of the upper roll 118, the coupling device 121, and an upper roll gear shaft 117 of the upper roll gear 116 is shown. In the flat-member-feeding device 101, the upper roll shaft 120 and the upper roll gear shaft 117 are coupled to each other via the coupling device 121. As the coupling device 121, when it is desired that a flat member is clamped, it is only required for the coupling device 121 to be operable to move the upper roll shaft 120 downward in the vertical direction with respect to the upper roll gear shaft 117, whereas when it is desired that a flat member is released, it is only required for the coupling device 121 to be operable to move the upper roll shaft 120 upward in the vertical direction with respect to the upper roll gear shaft 117. As such a coupling device 121, for example, an Oldham's coupling is cited.

The flat-member-feeding device 101 of the present disclosure as described above is used, thereby allowing reduction in power consumption to be realized and enabling a flat member to be quickly supplied to a press apparatus or the like. A processing apparatus such as a press apparatus subjects a flat member conveyed from the flat-member-feeding device 101 to working processing such as press working, thus allowing a structure such as a small component used for an information-related device such as a mobile phone and a personal computer to be manufactured.

It should be further understood by those skilled in the art that although the foregoing description has been made on the embodiments of the present disclosure, the present disclosure is not limited thereto and various changes and modifications may be made without departing from the spirit of the present disclosure and the scope of the appended claims.

What is claimed is:
1. A flat-member-feeding device comprising:
a housing;
a first roll being housed inside the housing;
a second roll being housed inside the housing and being disposed on an upper side of the first roll in a vertical direction; and
a first motor being coupled to one of the first roll and the second roll to rotate the one of the first roll and the second roll,
the flat-member-feeding device being operable to convey a flat member being clamped by the first roll and the second roll,
the first motor including a substantially cylindrical stator being provided with a hollow and a substantially cylindrical rotor being disposed in the hollow of the stator and being provided with a hollow, wherein
only a sleeve, being provided with a hollow, is disposed in the hollow of the rotor, the sleeve supports the substantially cylindrical rotor such that the sleeve is in contact with only the opposite ends of the substantially cylindrical rotor, to make the sleeve operable to rotate in conjunction with rotation of the rotor, and
the one end portion of the sleeve is coupled to a roll shaft, the one of the first roll and the second roll being fixed to the roll shaft, to make the one of the first roll and the second roll operable to rotate in conjunction with rotation of the sleeve.

2. The flat-member-feeding device according to claim 1, wherein the sleeve does not support a central portion between the one end portion and the another end portion of the substantially cylindrical rotor.

3. The flat-member-feeding device according to claim 1, wherein at least one part of the stator directly contacts outside air.

4. The flat-member-feeding device according to claim 1, comprising a second motor being coupled to another of the first roll and the second roll, the second motor including a substantially cylindrical stator being provided with a hollow and a substantially cylindrical rotor being disposed in the hollow of the stator and being provided with a hollow.

5. The flat-member-feeding device according to claim 1, wherein the roll shaft with the one of the first roll and the second roll being fixed is provided with a first gear, a roll shaft with another of the first roll and the second roll being fixed is provided with a second gear, and the first gear and the second gear are engaged with each other, to make the another of the first roll and the second roll operable to rotate in conjunction with rotation of the one of the first roll and the second roll.

6. The flat-member-feeding device according to claim 1, wherein a roll shaft with at least one of the first roll and the second roll being fixed is provided with a coupling device, and via the coupling device, the at least one of the first roll and the second roll is operable to move in a vertical direction with respect to the housing.

7. A method for manufacturing the flat-member-feeding device according to claim 1, the method comprising the steps of:
detaching, from the motor including a substantially cylindrical stator being provided with a hollow and a substantially cylindrical rotor being disposed in the hollow of the stator and being provided with a hollow, a first fixing member being disposed to avoid attachment of the stator and the rotor;
attaching a sleeve to the rotor such that the sleeve is disposed so as to occupy one part of the hollow of the rotor, one end portion of the rotor is supported by one end portion of the sleeve, and another end portion of the rotor is supported by another end portion of the sleeve;
attaching the sleeve to a roll shaft, the one of the first roll and the second roll being fixed to the roll shaft; and
detaching a second fixing member being disposed to avoid attachment of the stator and the rotor.

8. The method according to claim 7, further comprising the step of attaching an attaching plate to the stator, the stator being attached to the housing via the attaching plate.

9. The method according to claim 7, further comprising the step of, after the step of detaching the second fixing member, attaching a motor housing to the stator, the motor housing not covering at least one part of the stator.

10. The method according to claim 7, further comprising the step of, after the step of detaching the second fixing member, attaching a rotational angle sensor to the sleeve.

\* \* \* \* \*